United States Patent
Alexander et al.

(10) Patent No.: US 9,195,404 B2
(45) Date of Patent: Nov. 24, 2015

(54) EXPOSING PROTECTED MEMORY ADDRESSES

(71) Applicants: James W. Alexander, Hillsboro, OR (US); Devadatta V. Bodas, Federal Way, WA (US); Muralidhar Rajappa, Chandler, AZ (US); Ramkumar Nagappan, Chandler, AZ (US); Andy Hoffman, Olympia, WA (US)

(72) Inventors: James W. Alexander, Hillsboro, OR (US); Devadatta V. Bodas, Federal Way, WA (US); Muralidhar Rajappa, Chandler, AZ (US); Ramkumar Nagappan, Chandler, AZ (US); Andy Hoffman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 14/109,534

(22) Filed: Dec. 17, 2013

(65) Prior Publication Data

US 2015/0169224 A1     Jun. 18, 2015

(51) Int. Cl.
G06F 3/06      (2006.01)
G06F 12/14     (2006.01)

(52) U.S. Cl.
CPC .............. *G06F 3/065* (2013.01); *G06F 3/0614* (2013.01); *G06F 3/0622* (2013.01); *G06F 3/0673* (2013.01); *G06F 12/14* (2013.01); *G06F 12/1425* (2013.01)

(58) Field of Classification Search
CPC ..... G06F 3/0614; G06F 3/0622; G06F 3/065; G06F 3/0673; G06F 12/14; G06F 12/1425
See application file for complete search history.

(56) References Cited

U.S. PATENT DOCUMENTS

2008/0163382 A1 *   7/2008   Blue et al. ..................... 726/28

* cited by examiner

*Primary Examiner* — Aracelis Ruiz
(74) *Attorney, Agent, or Firm* — Lowenstein Sandler LLP

(57) ABSTRACT

Mechanisms for exposing a protected memory address are provided. A processing device may store a data value at a protected memory address. The protected memory address may be a control register or a status register. The processing device may identify a mirror relationship between the protected memory address and an unprotected memory address and copy the data value from the protected memory address to the unprotected memory address. The unprotected memory address may be directly accessible via an external interface.

20 Claims, 12 Drawing Sheets

US 9,195,404 B2

EXPOSING PROTECTED MEMORY ADDRESSES

TECHNICAL FIELD

Embodiments described herein generally relate to processing devices and, more specifically, relate to accessing protected memory addresses.

BACKGROUND

Processing devices access memory when performing operations and/or when executing instructions of an application. For example, a processing device may read data from a memory location and/or may write data to a memory location when adding two numbers (e.g., may read the two numbers from multiple memory locations and may write the result to another memory location). A memory location may be a protected memory location or an unprotected memory location. A protected memory location may have restrictions on how the memory location is accessed as compared to an unprotected memory location. Control data and status data may be stored in the protected memory locations.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
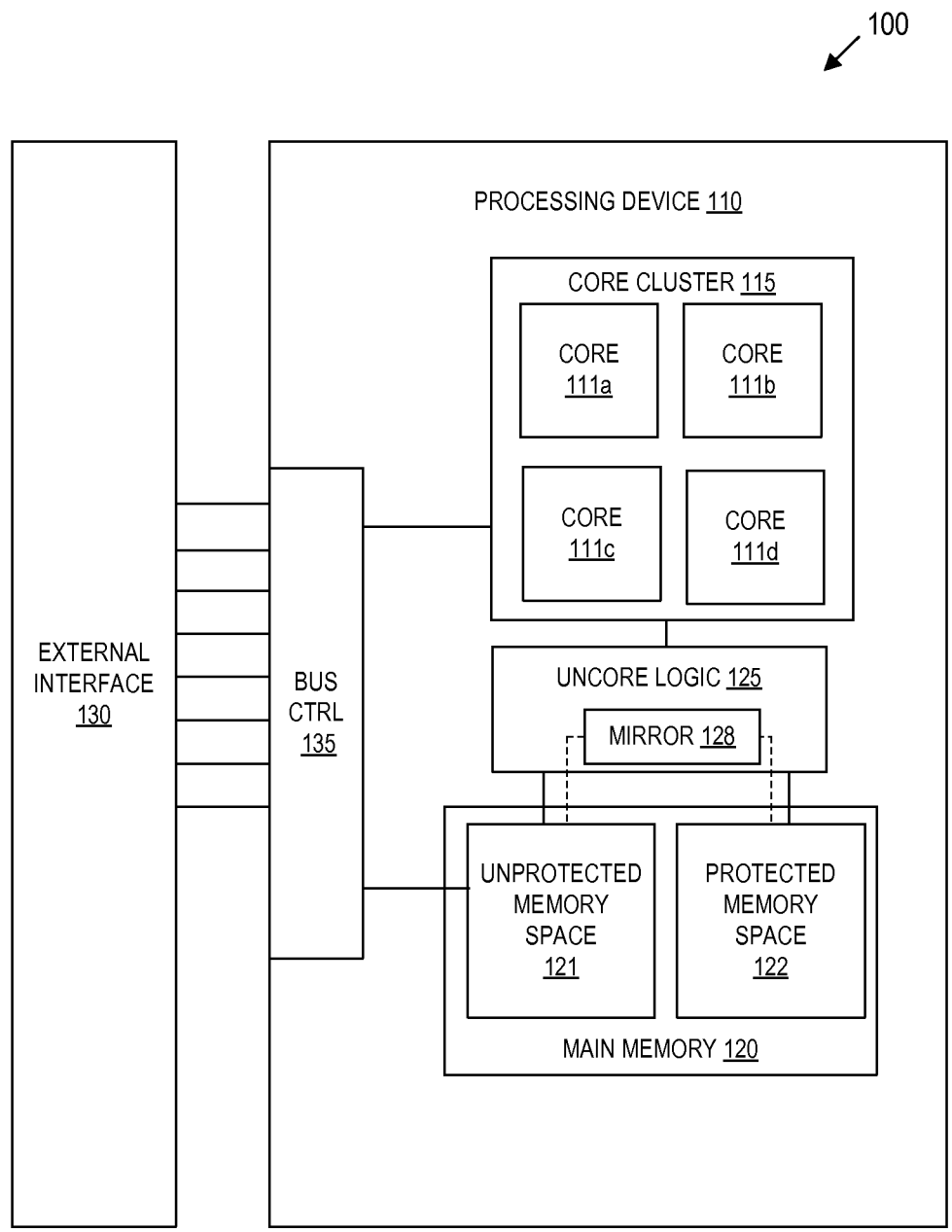
FIG. 1 is a block diagram of a system architecture, according to one embodiment of the disclosure.

Processing devices access memory when performing operations and/or when executing instructions of an application. A memory location may be an unprotected memory location or a protected memory location. A protected memory location may have restrictions on how the memory location is accessed as compared to an unprotected memory location. For example, a protected memory location may be accessible by an operating system or a kernel space module executed by a processing device, but may be inaccessible by an application that runs in user space. An unprotected memory location may be accessed by any application executed by the processing device or directly via an external interface. Protected memory locations may include control registers and status registers.

In one embodiment, a request to read data from a protected memory location can decrease the computational efficiency of the processing device handling the request. For example, when a request to read data from the protected memory location is transmitted over an external interface, a software interrupt to an operating system may be generated. In response to receiving the interrupt, the operating system may delay execution of the scheduled instructions of a processing unit by interposing instructions to retrieve the requested data. The processing unit may retrieve the data from the protected memory location and the data may be returned via the external interface.

Because the processing unit may have execution of some of its scheduled instructions delayed by execution of instructions to retrieve the requested data, its output to other processing units relying on the result of the scheduled instructions may be likewise delayed. This may introduce "jitter" into a cluster of processing units, whereby one of the other processing units is idle while awaiting the expected result from the first processing unit.

Thus, the request to read data from the protected memory location can decrease computational efficiency of the processing device in two ways: (1) a processing unit may use computing resources to execute the instructions to retrieve the data that could have been used performing its scheduled processing and (2) other processing units may be idle while awaiting the results from the first processing unit instead of performing additional processing.

Embodiments of the disclosure provide for systems and methods of exposing protected memory locations (e.g., control registers and status registers) that avoids generation of interrupts or involving processing units to retrieve the data stored in the protected memory locations.

In one embodiment, a processing device stores a data value, such as a power sensor value or a power effector setting, at a protected memory address. The protected memory address may include a control register or a status register. The processing device may identify a mirror relationship between the protected memory address and the unprotected memory address. For example, the processing device may store a mapping that associates a set of protected memory addresses with corresponding unprotected memory addresses. The processing device may copy the data value from the protected memory address to the unprotected memory address. Thus, as the unprotected memory address may be directly accessible via an external interface without involving interrupts or processing units, the data value stored in the protected memory address (and, after the copying, also in the unprotected memory address) can be similarly directly accessible via the external interface.

The processing device may further receive an updated data value via the external interface to be stored in the protected memory address. Because the protected memory address may not be directly accessible via the external interface, the external interface may store the updated data value, instead, in the corresponding unprotected memory address. The processing device may copy the updated data value from the unprotected memory address to the protected memory address. Thus, the updated data value received via the external interface can be stored in the protected memory address.

In this way, the mirror relationship between the protected memory address and the unprotected memory address can be maintained, such that changes to data in either the protected memory address or the unprotected memory address are mirrored in the corresponding memory address and the data in the protected memory address and unprotected memory address is kept equivalent.

FIG. 1 is a block diagram of a computer system 100, according to one embodiment of the disclosure. The computer system 100 includes a processing device 110. The processing device 110 includes a cluster 115 of one or more cores 111a-111d and also includes a number of other modules. A cluster 115 includes multiple cores 111a-111d, each capable of independently processing instructions. Each core 111a-111d may include, for example, arithmetic logic units (ALUs), floating point logic units (FLUs), and core cache (e.g., at least one of an L1 and L2 cache). The processing device 110 includes main memory 120 coupled to the cores 111a-111d by uncore logic 125. The uncore logic 125 includes logic for, among other things, maintaining, reading from, and writing to the main memory 120. The uncore logic 125 may include one or more of a home agent, an integrated memory controller, a power unit, or other processing units.

The computer system 110 includes an external interface 130 coupled to the processing device 110 via a bus controller 135. The external interface 130 may be a physical interface that allows a cable to be connected to the computer system and input data to or extract data from the processing device 110. The external interface 130 may be a serial port or a parallel port and may include a RS-232 standard port, an Ethernet port, a Firewire port, a universal serial bus (USB) interface, a PS/2 port, or any other interface, port, or bus. The external interface 130 may include a PCIe (Peripheral Component Interconnect Express) interface. The bus controller 135 is a processing unit including logic for communicating over the external interface 130.

The main memory 120 is partitioned into a protected memory space 122, which may also be referred to as the kernel space or Ring 0, and an unprotected memory space 121, which may also be referred to as the user space or Ring 1+. The processing device 110 may impose restrictions, enforced by the uncore logic 125 (e.g., a home agent of the uncore logic 125), on access of the protected memory space 122. For example, in one embodiment, an operating system executed by the processing device 110 may have access to the protected memory space 122, but user applications executed by the processing device 110 in user space may not have access to the protected memory space 122.

Further, whereas the unprotected memory space 121 may be directly accessible via the external interface 130 (by way of the bus controller 135), the protected memory space 122 may not be accessible via the external interface 130, except via the cores 111a-111d. Thus, when a user sends a request to read data from or write data to the protected memory space 122, the at least one of the cores 111a-111d may cease performing at least some its scheduled operations to answer this request.

For example, in one embodiment, a request to read data from the protected memory space 122 may be transmitted over the external interface 130. The bus controller 135 may generate a software interrupt to an operating system executed by processing device 110. In response to receiving the interrupt, the operating system may delay the scheduled instructions in one of the cores 111a by interposing instructions to retrieve the requested data. The core 111a may communicate with the uncore logic 125 to retrieve the data from the protected memory space 112 and return it to the bus controller 135. The bus controller 135 may output the data via the external interface 135.

Because the core 111a may have execution of some of its scheduled instructions delayed by execution of instructions to retrieve the requested data, its output to other cores 111b-111d that may be relying on the result of the scheduled instructions may be likewise delayed. This can introduce "jitter" into the core cluster 115, whereby one of the other cores 111b-111d is idle while awaiting the expected result from the first core 111a.

Thus, the request to read data from the protected memory space 122 can decrease computational efficiency of the core cluster 115 in two ways: (1) the first core 111a may use computing resources to execute the instructions to retrieve the data that could have been used performing its scheduled processing and (2) others of the cores 111b-111d may be idle while awaiting the results from the first core 111a instead of performing additional processing.

In contrast, the unprotected memory space 121 may be directly accessible via the external interface 130 (by way of the bus controller 135). For example, in one embodiment, a request to read data from the unprotected memory space 121 may be transmitted over the external interface 130. The bus controller 135 may access the unprotected memory space 121 and return the requested data via the external interface 135. In one embodiment, the bus controller 135 may instruct the uncore logic 125 to access the unprotected memory space 121 and the uncore logic 125 may access the unprotected memory space 121 and return the requested data to the bus controller 135.

Thus, the reading of data from the unprotected memory space 121 may not involve any of the cores 111a-111d. Further, the reading of data from the unprotected memory space 121 may not involve an operating system or the generation of a software interrupt that delays the execution of instructions.

In one embodiment, one or more memory addresses of the protected memory space 122 are mirrored to one or more additional memory addresses in the unprotected memory space 121 such that a portion of the protected memory space 122 can, in a sense, be directly accessed via the external interface. That is, a portion of the data stored in the protected memory space 122 can be directly accessed via the external interface because an exact copy of the data stored in the protected memory space 122 is also stored in the unprotected memory space 121, which is directly accessible via the external interface 130.

The one or more memory addresses of the protected memory space 122 may be mirrored to one or more additional memory addresses in the unprotected memory space 121 by a mirror component 128 of the uncore logic 125. The mirror component 128, as described in further detail below, may maintain a mirror relationship between addresses in the protected memory space 122 and the unprotected memory space 121.

Figure 2:
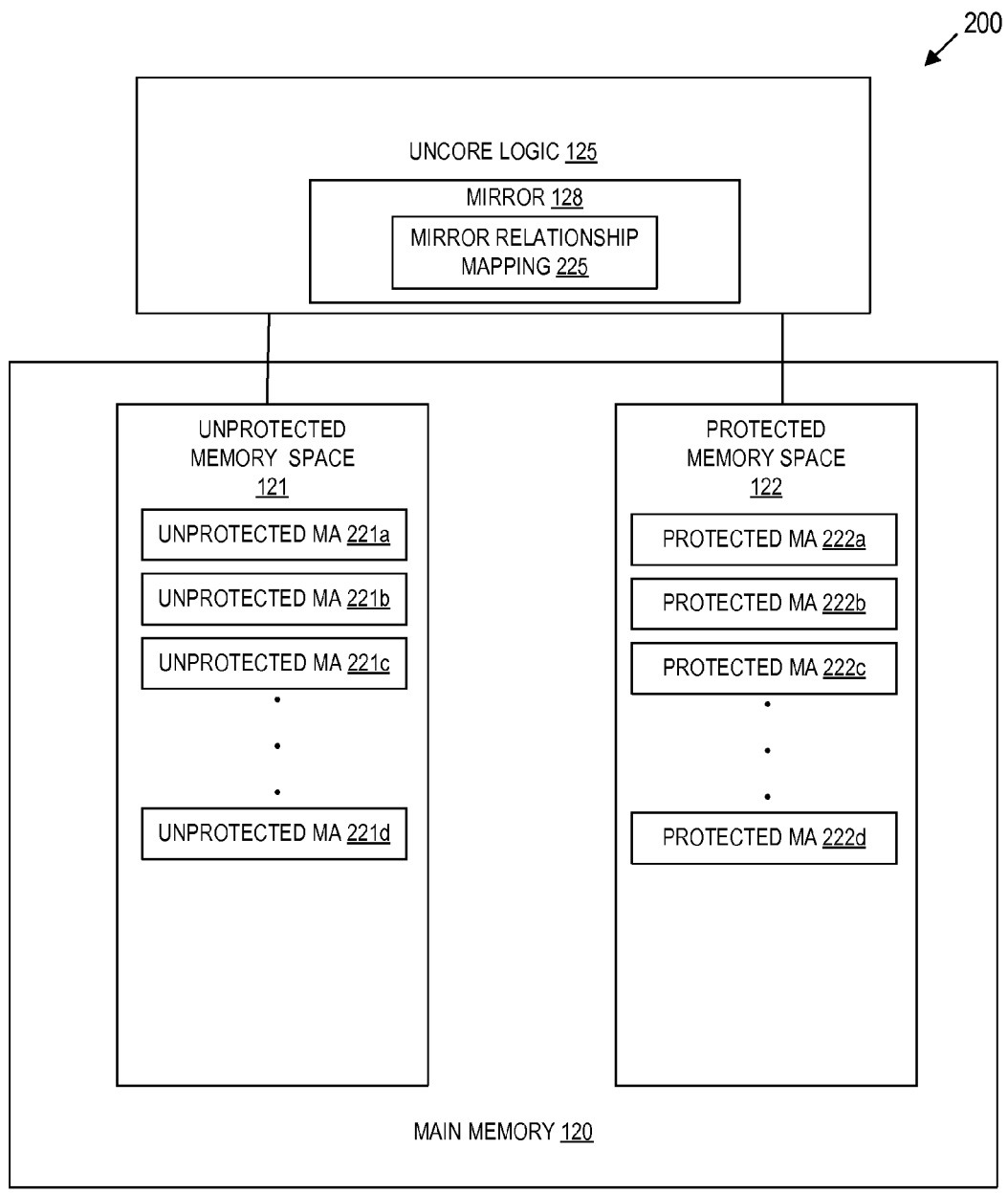
FIG. 2 is a block diagram of a memory module, according to an embodiment of the disclosure.

FIG. 2 is a block diagram of a memory module 200, according to an embodiment of the disclosure. The memory module 200 includes the main memory 120 and uncore logic 125 described above with respect to FIG. 1. As also described above, the main memory 120 includes a protected memory space 122 and an unprotected memory space 121. The protected memory space 122 includes a set of protected memory locations identified by a respective set of protected memory addresses 222a-222d. Similarly, the unprotected memory space 121 includes a set of unprotected memory locations identified by a respective set of unprotected memory addresses 221a-221d.

It is to be appreciated that although a memory address does not store data, but is a data concept, typically a fixed-length sequence of digits, that identifies a particular memory location having data stored at that location, as used herein, "data stored at a memory address" refers to data stored at the memory location identified by the particular memory address. For example, reference to a protected data setting stored at a particular protected memory address 222b refers to the protected data setting stored at a protected memory location in the protected memory space 222 identified by the particular protected memory address 222b.

The uncore logic 125 includes a mirror relationship mapping 225 that maps at least some of the protected memory addresses 222a-222d to corresponding unprotected memory addresses 221a-221d. In one embodiment, the mapping may be a one-to-one mapping. In one embodiment, the mirror relationship mapping 225 may be stored in cache of the uncore logic 125. For example, the mirror relationship mapping 225 may be stored as a table in the cache. As another example, the mirror relationship mapping 225 may be defined in code executable by the uncore logic 125 (e.g., by a power control unit of the uncore logic). The mirror relationship mapping 225 may be defined by a data structure (as in a table). For each of a number of the protected memory addresses 222a-222d, the data structure may include references to a corresponding unprotected memory address 221a-221d. The mirror relationship mapping 225 may be defined functionally, such that the corresponding unprotected memory address for a protected memory address is defined as a function of the protected memory address, e.g., by adding or subtracting an offset value to the protected memory address. The mirror relationship mapping 225 may be defined, stored, or generated in other ways.

The mirror relationship mapping 225 can be used by the mirror component 128 of the uncore logic 125 to generate a mirror copy of at least a portion of the protected memory space 122 in the unprotected memory space 121 that is directly accessible via an external interface. The mirror relationship mapping 225 may be used both to copy from the protected memory space 122 to the unprotected memory space 121 and to copy from the unprotected memory space 121 to the protected memory space 122. Thus, the mirror relationship mapping 225 may be bidirectional. In one embodiment, the mirror component 128 of the uncore logic 125 performs the copying. In another embodiment, the one or more of the cores 111a-111d of FIG. 1 performs the copying.

Figure 3:
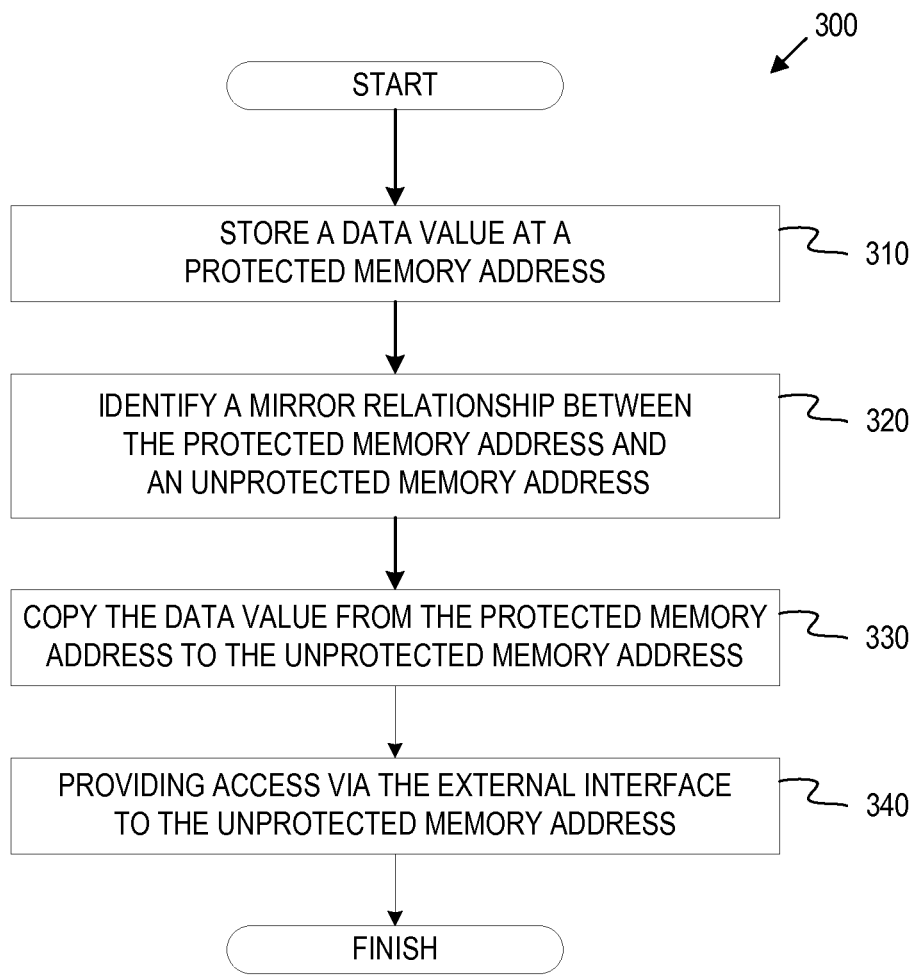
FIG. 3 is a flow diagram illustrating a method of exposing a protected memory address for a read operation, according to one embodiment of the disclosure.

FIG. 3 is a flow diagram illustrating a method 300 of exposing a protected memory address for a read operation, according to one embodiment of the disclosure. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by processing logic of the uncore logic 125 and/or the bus controller 135 described above with respect to FIGS. 1 and 2. In another embodiment, the method 300 may be performed by one or more of the cores 111a-111d or an operating system executing on the processing device 110.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

At block 310 of method 300, processing logic stores a data value at a protected memory address. The protected memory address may be a memory address of a kernel space, a Ring 0 space, or any other protected memory space. The protected memory address may be a control register or a status register. The protected memory address may be a model-specific register. A model-specific register (MSR) may comprise any of various control registers in the x86 instruction set used for, e.g., debugging, program execution tracing, computer performance monitoring, and toggling certain CPU features. The data value stored in the protected memory address may be a power sensor data value indicative of the amount of power a particular core is using as determined by a power sensor. The data value may be a power effector setting data value indicating an amount of power a particular core is allocated. Although the method 300 is described herein with respect to a single data value at a single protected memory address, it is to be appreciated that the method 300 may be performed simultaneously or sequentially for multiple data values at a set of protected memory addresses.

At block 320, the processing logic identifies a mirror relationship between the protected memory address and an unprotected memory address. The mirror relationship may be identified using a mirror relationship mapping as described above with respect to FIG. 2. For example, the mirror relationship may be identified by a reference or pointer, or may be identified functionally. Thus, the processing logic, at block 320, may determine an unprotected memory address that corresponds to the protected memory address. In one embodiment, specific memory addresses of the protected memory that are allocated for storage of power sensor data and/or power effector settings are mirrored. The unprotected memory locations may comprise registers in the uncore, denoted CSRs, such as boot scratchpad registers.

At block 330, the processing logic copies the data value from the protected memory address to the unprotected memory address having a mirror relationship with the protected memory address. In one embodiment, the processing logic may include a cache and the processing logic may copy the data value from the protected memory address to the cache and then from the cache to the unprotected memory address.

At block 340, the processing logic provides access via the external interface to the unprotected memory address. In one embodiment, as described above, a bus controller can directly access the unprotected memory address without involving other uncore logic or a core. In another embodiment, the bus controller communicates with other uncore logic without involving the core. In one embodiment, processing logic receives a request to access a memory address of protected memory. Processing logic may determine from the mapping that the requested protected memory address has a mirror relationship with an unprotected memory address. Responsive to such a determination, the processing logic may provide to the requestor the contents of the unprotected memory address.

The method 300 may be performed periodically according to a predetermined schedule or may be performed whenever a change to the protected memory address with a corresponding unprotected memory address is detected. For example, in one embodiment, whenever a change to a protected memory address having a corresponding unprotected memory address is detected, the method 300 may be performed for that protected memory address. A change to a protected memory address having a corresponding unprotected memory address may be detected by detecting a change to any memory address and determining whether the changed memory address is a protected memory address having a corresponding unprotected memory address.

In another embodiment, the method 300 may be performed during a memory refresh, the process by which the memory controller maintains the memory by reading data from a memory address and rewriting that same data to the memory address. In one embodiment, the memory refresh occurs approximately every 64 milliseconds. In one embodiment, the method 300 is performed every memory refresh. In another embodiment, the method 300 is performed every second, fifth, or tenth memory refresh. The method 300 may be performed at other intervals.

Figure 4:
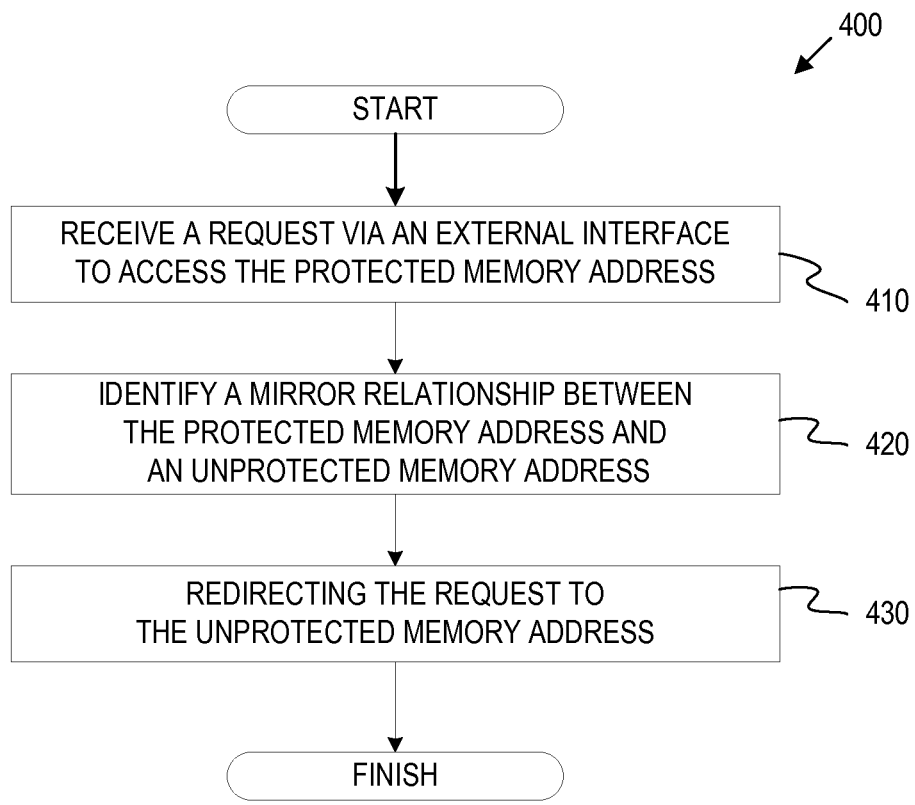
FIG. 4 is a flow diagram illustrating a method of redirecting a request to access a protected memory address, according to one embodiment of the disclosure.

FIG. 4 is a flow diagram illustrating a method 400 of redirecting a request to access a protected memory address, according to one embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logic of the uncore logic 125 and/or the bus controller 135 described above with respect to FIGS. 1 and 2. In another embodiment, the method 400 may be performed by one or more of the cores 111a-111d or an operating system executing on the processing device 110.

At block 410 of method 400, processing logic receives a request via an external interface to access a protected memory address. The request may be received by a bus controller from an external interface. The request may identify the protected memory address as a fixed-length sequence of digits.

At block 420, the processing logic identifies a mirror relationship between the protected memory address and an unprotected memory address. The mirror relationship may be identified using a mirror relationship mapping as described above with respect to FIG. 2. For example, the mirror relationship may be identified by reference or functionally. Thus, the processing logic, at block 420, may determine an unprotected memory address that corresponds to the protected memory address.

At block 430, the processing logic redirects the request to the unprotected memory address. The request to read or write a data value at the memory location identified by the protected memory address may return or change the data value stored at the memory location identified by the corresponding unprotected memory address. Because the mirror relationship is maintained, as described above, the data values may be identical.

Figure 5:
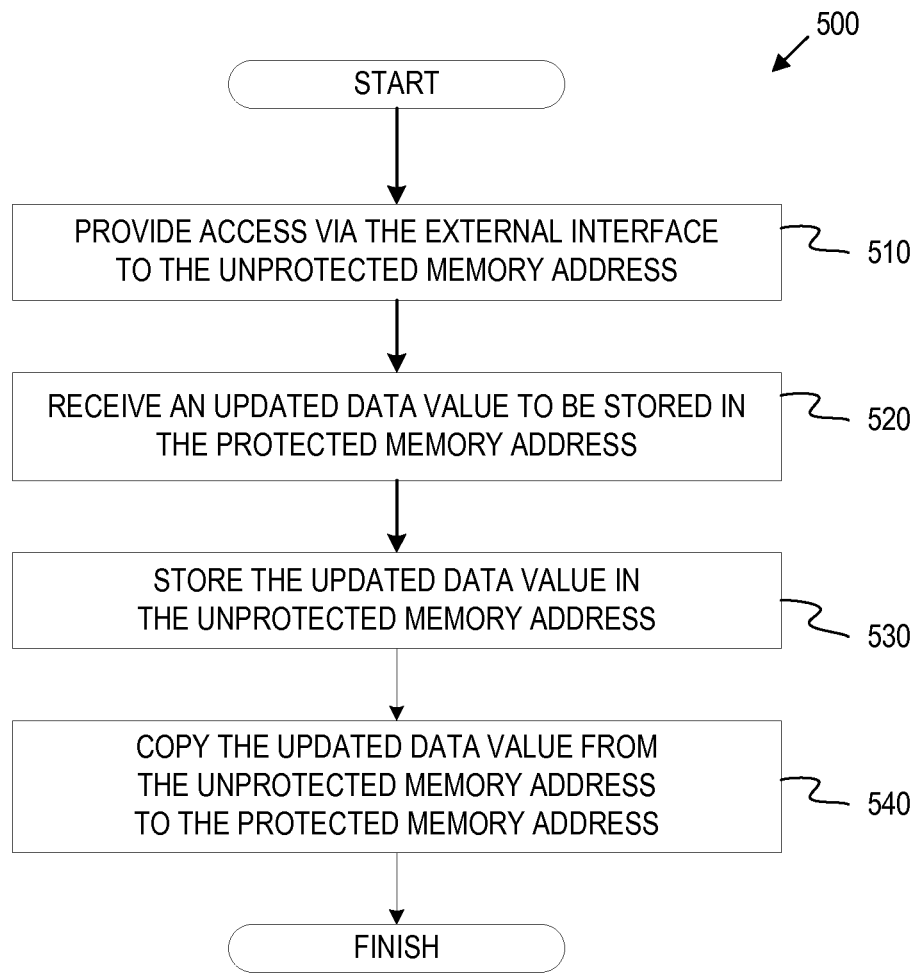
FIG. 5 is a flow diagram illustrating a method of exposing a protected memory address for a write operation, according to one embodiment of the disclosure.

FIG. 5 is a flow diagram illustrating a method of exposing a protected memory address for a write operation, according to one embodiment of the disclosure. Method 500 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 500 may be performed, in part, by processing logic of the uncore logic 125 and/or the bus controller 135 described above with respect to FIGS. 1 and 2. In another embodiment, the method 500 may be performed by one or more of the cores 111a-111d or an operating system executing on the processing device 110.

At block 510 of method 500, processing logic provides access via an external interface to an unprotected memory address. In one embodiment, as described above, a bus controller can directly access the unprotected memory address without involving other uncore logic or a core. In another embodiment, the bus controller communicates with other uncore logic without involving the core.

At block 520, the processing logic receives an updated data value to be stored in a protected memory address. The updated data value may be, for example, a power effector setting data value or another control setting data value. In one embodiment, the updated data value is packaged in a message that indicates that it is to be stored in a protected memory address. In one embodiment, the updated data value is received in a write command specifying an unprotected memory address that is mapped to the protected memory address. Alternatively, the updated data value may be received in a write command specifying the protected memory address.

At block 530, the processing logic stores the updated data value in the unprotected memory address corresponding to the protected memory address where the updated data value is to be stored.

At block 540, the processing logic copies the updated data value from the unprotected memory address to the protected memory address. In one embodiment, the processing logic may include a cache and the processing logic may copy the data value from the protected memory address to the cache and then from the cache to the unprotected memory address.

The method 500 may be performed periodically according to a predetermined schedule or may be performed whenever a change to the protected memory address with a corresponding unprotected memory address is detected. For example, in one embodiment, whenever a change to a protected memory address having a corresponding unprotected memory address is detected, the method 500 may be performed for that protected memory address. A change to a protected memory address having a corresponding unprotected memory address may be detected by detecting a change to any memory address and determining whether the changed memory address is a protected memory address having a corresponding unprotected memory address.

In another embodiment, the method 500 may be performed during a memory refresh, the process by which the memory controller maintains the memory by reading data from a memory address and rewriting that same data to the memory address. In one embodiment, the memory refresh occurs approximately every 64 milliseconds. In one embodiment, the method 500 is performed every memory refresh. In another embodiment, the method 500 is performed every second, fifth, or tenth memory refresh. The method 500 may be performed at other intervals.

Figure 6:
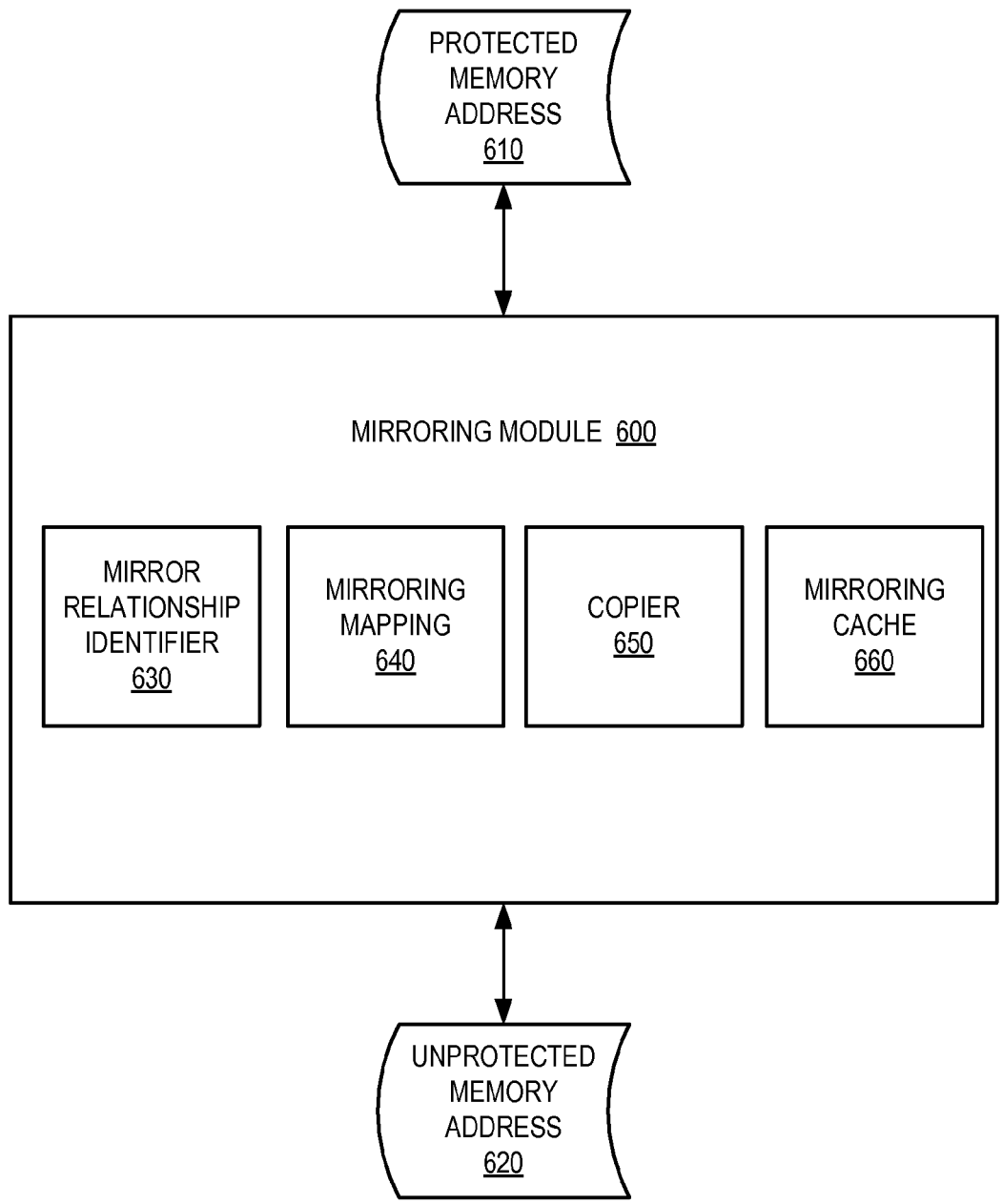
FIG. 6 is a block diagram of a mirroring module, according to one embodiment of the disclosure.

FIG. 6 is a block diagram of a mirroring module 600, according to one embodiment of the disclosure. The mirroring module 600 receives, as input, data from either a protected memory address 610 or an unprotected memory address 620. The mirror module includes a mirror relationship identifier 630 which identifies a mirror relationship between the protected memory address 610 and the unprotected memory address 620. The mirror relationship identifier may identify the mirror relationship between two memory addresses by consulting a mirroring mapping 640 stored as part of the mirroring module 600 or separately.

The mirroring module 600 includes a copier 650 that reads data from the protected memory address 610 and writes a copy of the data to the unprotected memory address 620 or receives data from the unprotected memory address 620 and writes a copy of the data to the protected memory address 610. The copier 650 may intermediately copy the data to a mirroring cache 660 allocated as part of the mirroring module 600 or separately.

Figure 7:
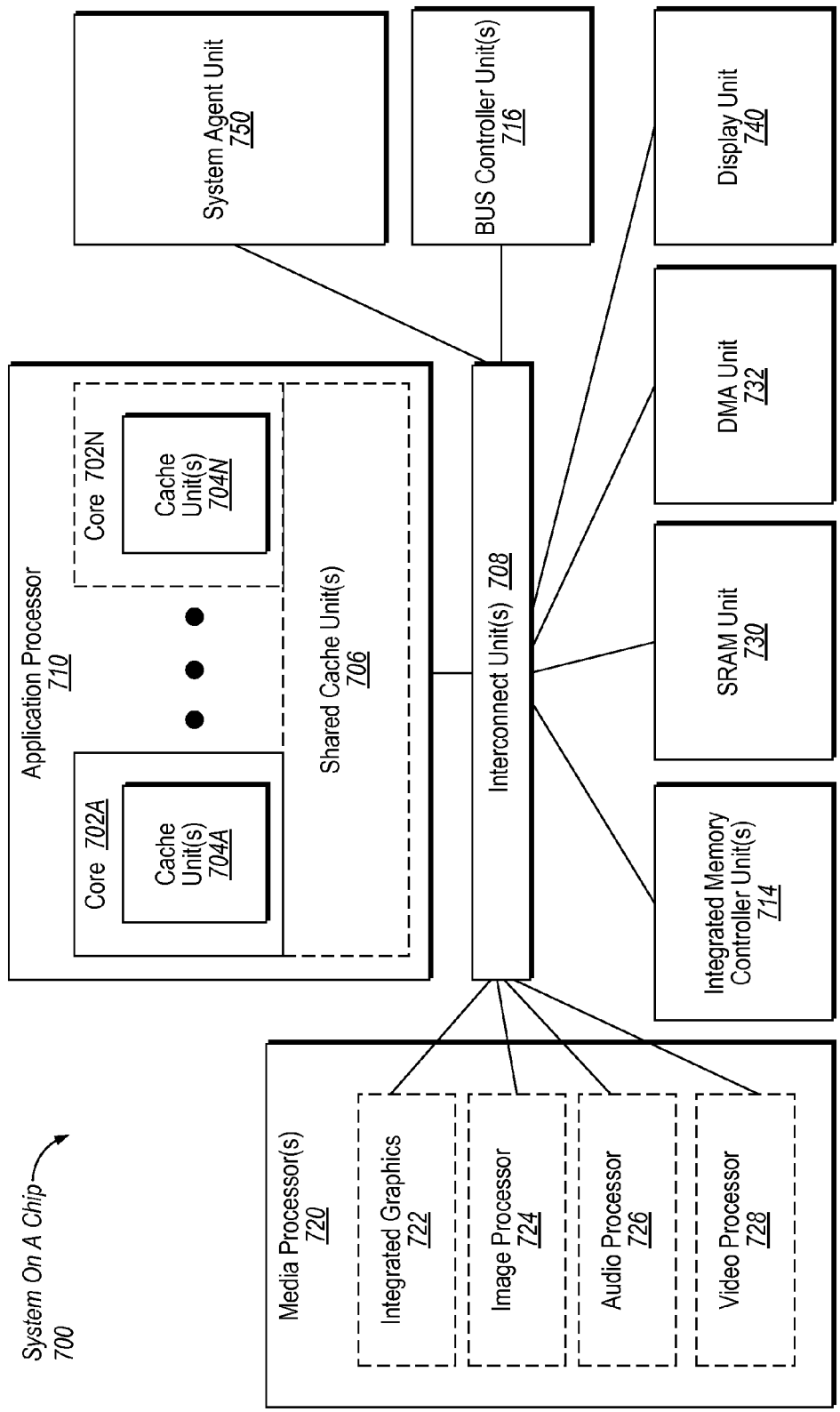
FIG. 7 is a block diagram of a system on chip (SoC), in accordance with an embodiment of the present disclosure.

FIG. 7 is a block diagram of a SoC 700 in accordance with an embodiment of the present disclosure. Dashed lined boxes are optional features on more advanced SoCs. In FIG. 7, an interconnect unit(s) 708 is coupled to: an application processor 710 which includes a set of one or more cores 702A-702N and shared cache unit(s) 706; a system agent unit 750; a bus controller unit(s) 716; an integrated memory controller unit (s) 714; a set of one or more media processors 720 which may include integrated graphics logic 722, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, mirroring logic (as discussed in conjunction with FIGS. 1-6) may be included in the one or more of the cores 702A through 702N. In another embodiment, the mirroring logic may be included in one or more other components of the SoC 700 that may be used to mirror address spaces.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-702N are capable of multi-threading.

The system agent 750 includes those components coordinating and operating cores 702A-702N. The system agent unit 750 may include for example a power control unit (PCU) and a display unit. The PCU may be or include logic and components needed for regulating the power state of the cores 702A-702N and the integrated graphics logic 708. The display unit 740 is for driving one or more externally connected displays.

The cores 702A-702N may be homogenous or heterogeneous in terms of architecture and/or instruction set. For example, some of the cores 702A-702N may be in order while others are out-of-order. As another example, two or more of the cores 702A-702N may be capable of execution of the same instruction set, while others may be capable of executing only a subset of that instruction set or a different instruction set.

The application processor 710 may be a general-purpose processor, such as a Core™ i3, i5, i7, 2 Duo and Quad, Xeon™, Xeon-Phi™, Itanium™, XScale™ or StrongARM™ processor, which are available from Intel Corporation, of Santa Clara, Calif. Alternatively, the application processor 710 may be from another company, such as ARM Holdings, Ltd, MIPS, etc. The application processor 710 may be a special-purpose processor, such as, for example, a network or communication processor, compression engine, graphics processor, co-processor, embedded processor, or the like. The application processor 710 may be implemented on one or more chips. The application processor 710 may be a part of and/or may be implemented on one or more substrates using any of a number of process technologies, such as, for example, BiCMOS, CMOS, or NMOS.

Figure 8:
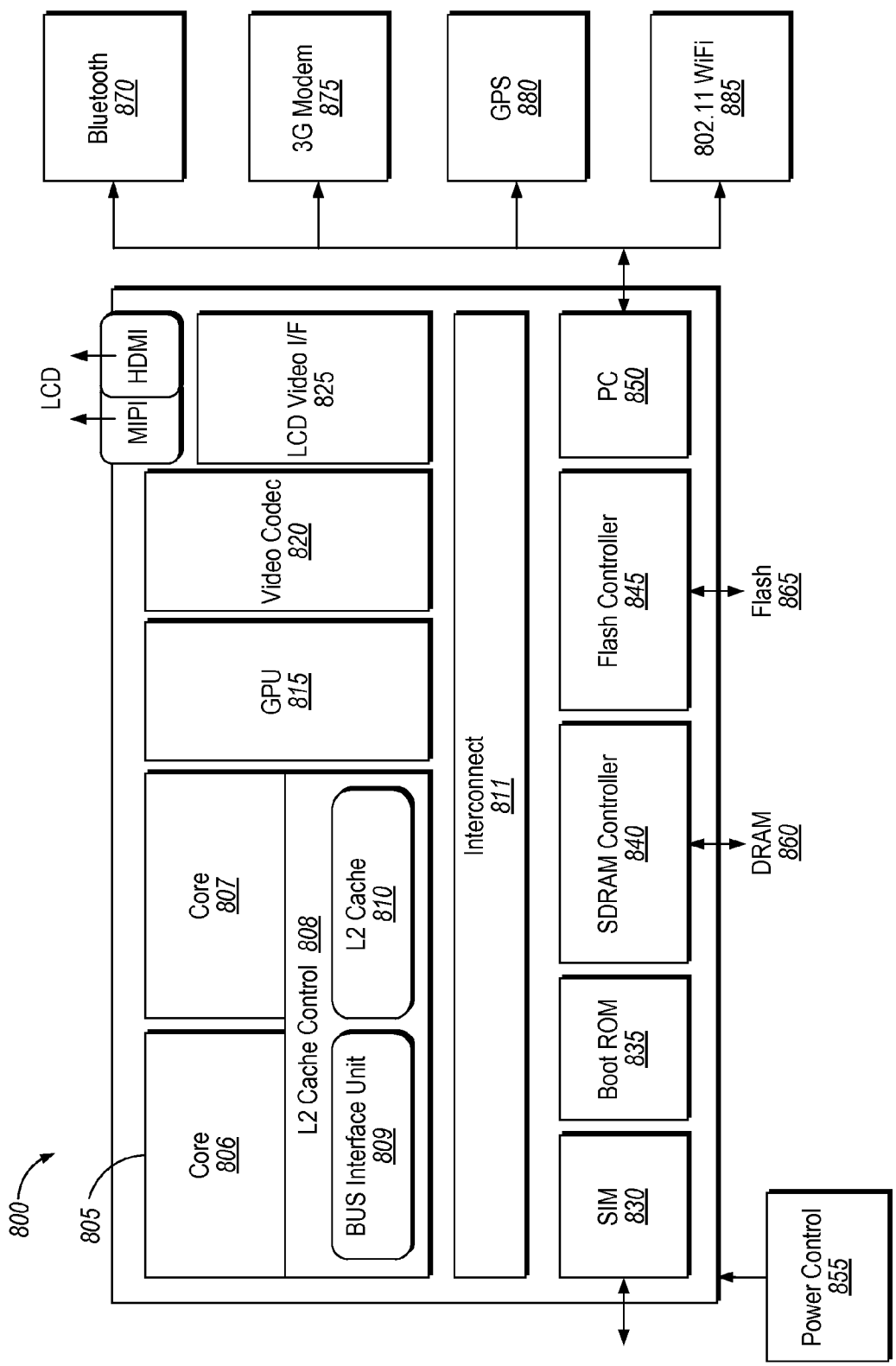
FIG. 8 is a block diagram of an embodiment of a system on-chip (SOC) design, in accordance with another embodiment of the present disclosure.

FIG. 8 is a block diagram of an embodiment of a system on-chip (SOC) design in accordance with the present disclosure. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, mirroring logic (as discussed in conjunction with FIGS. 1-6) may be included in the one or more of the cores 806 and 807. In another embodiment, the mirroring logic may be included in one or more other components of the SOC 800 that may be used to mirror address spaces.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnect discussed above, which potentially implements one or more aspects of the described disclosure.

Interface 811 provides communication channels to the other components, such as a Subscriber Identity Module (SIM) 830 to interface with a SIM card, a boot ROM 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system 800 illustrates peripherals for communication, such as a Bluetooth module 870, 3G modem 875, GPS 880, and Wi-Fi 885. Note as stated above, a UE includes a radio for communication. As a result, these peripheral communication modules are not all required. However, in a UE, some form a radio for external communication is to be included.

Figure 9:
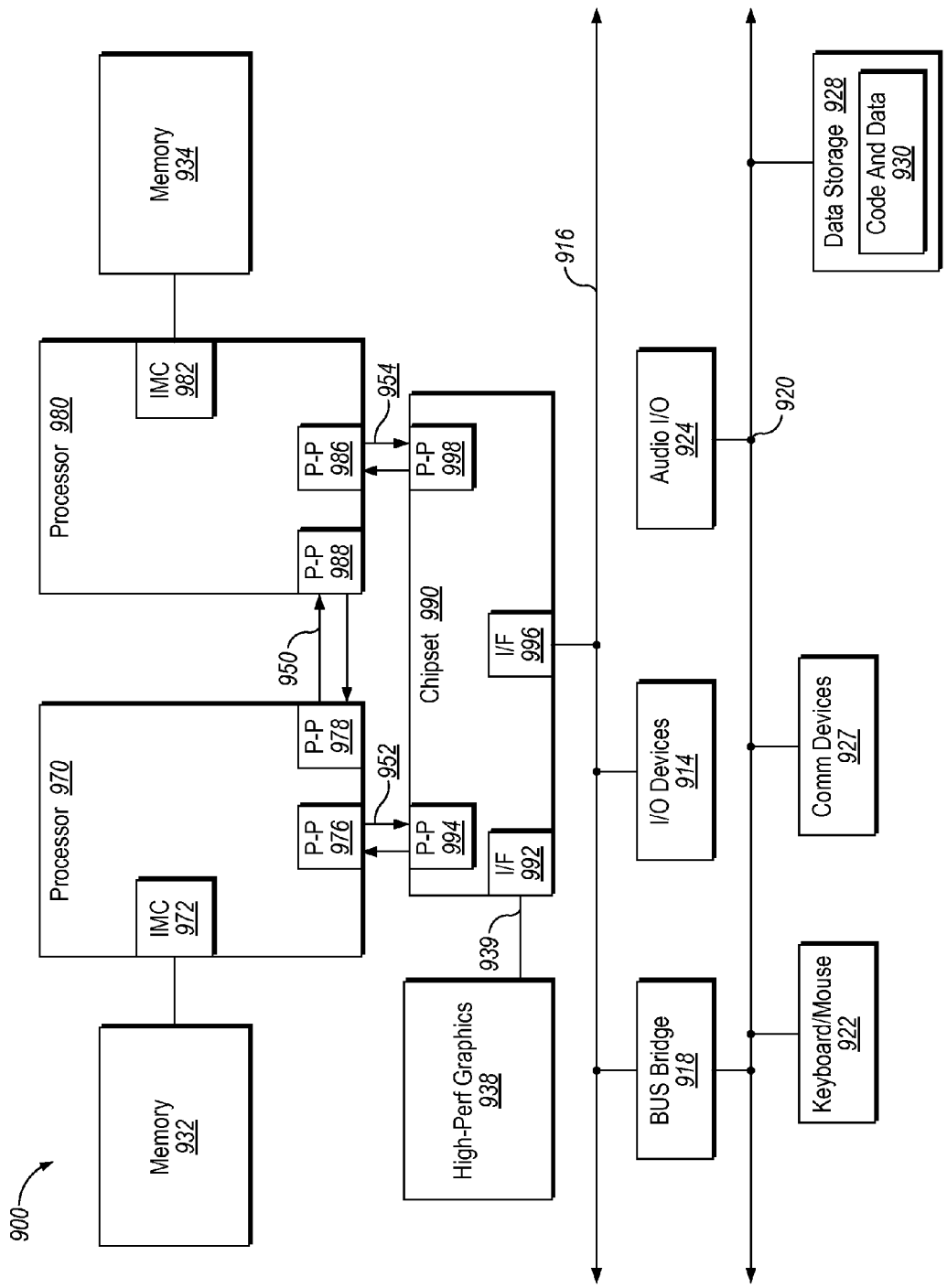
FIG. 9 is a block diagram of a computer system, according to one embodiment of the present disclosure.

FIG. 9 is a block diagram of a multiprocessor system 900 in accordance with an implementation. As shown in FIG. 9, multiprocessor system 900 is a point-to-point interconnect system, and includes a first processor 970 and a second processor 980 coupled via a point-to-point interconnect 950. Each of processors 970 and 980 may be some version of the processing device 110 of FIG. 1. As shown in FIG. 9, each of processors 970 and 980 may be multicore processors, including first and second processor cores, although potentially many more cores may be present in the processors. A processor core may also be referred to as an execution core. The processors each may include mirroring logic in accordance with an embodiment of the present. In one embodiment, mirroring logic (as discussed in conjunction with FIGS. 1-6) may be included in the one or more of the processors 970 and 980. In another embodiment, mirroring logic may be included in one or more other components of the multiprocessor system 900 that may be used to expose protected memory registers.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. The mirroring logic (as discussed in conjunction with FIGS. 1-6) may be included in the one or more integrated memory controller units 972 and 982. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, and 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
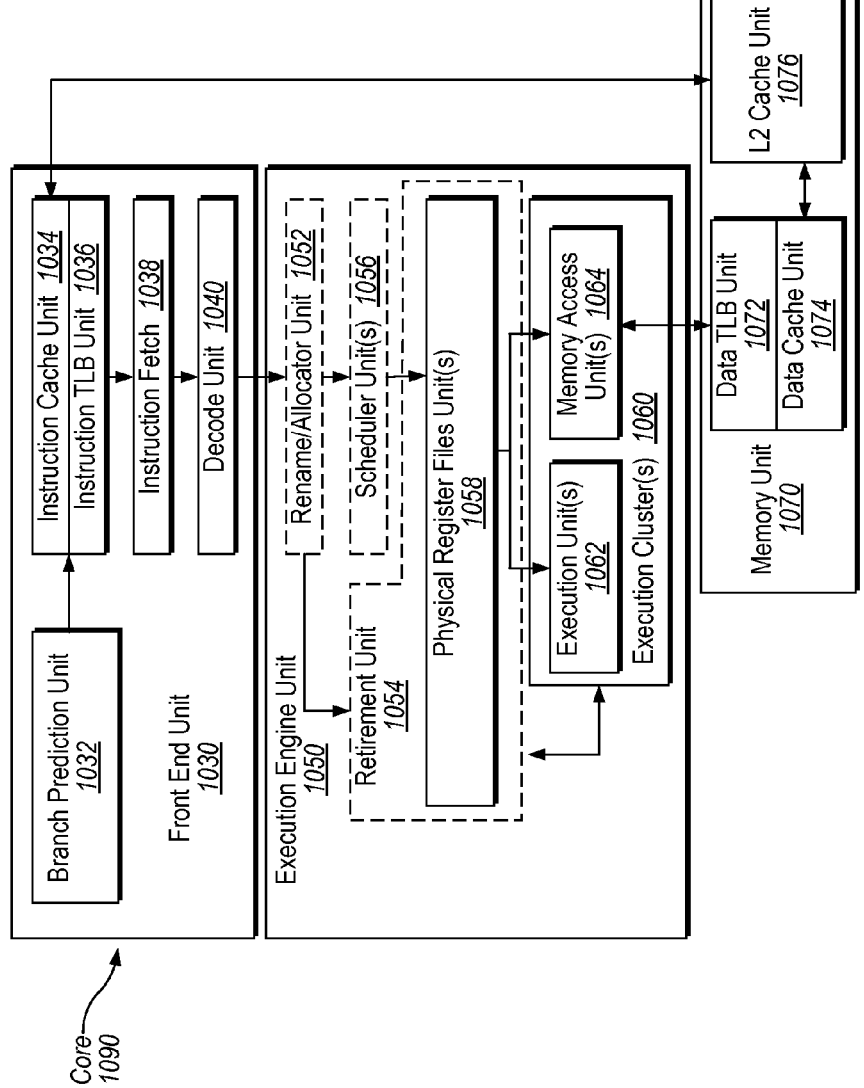
FIG. 10A is a block diagram illustrating an in-order pipeline and a register renaming stage, out-of-order issue/execution pipeline implemented by a processor core, in accordance with one embodiment of the present disclosure.
FIG. 10B is a block diagram illustrating an in-order architecture core and a register renaming logic, out-of-order issue/execution logic to be included in a processor according to at least one embodiment of the disclosure.

FIG. 10A is a block diagram illustrating an in-order pipeline and a register renaming stage, out-of-order issue/execution pipeline implemented by core 1090 of FIG. 10B (which may be include in a processor). FIG. 10B is a block diagram illustrating an in-order architecture core and a register renaming logic, out-of-order issue/execution logic that may be included in a processor according to at least one embodiment of the invention. The solid lined boxes in FIG. 10A illustrate the in-order pipeline, while the dashed lined boxes illustrates the register renaming, out-of-order issue/execution pipeline. Similarly, the solid lined boxes in FIG. 10A illustrate the in-order architecture logic, while the dashed lined boxes illustrates the register renaming logic and out-of-order issue/execution logic. In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1010, an execute stage 1016, a write back/memory write stage 1018, an exception handling stage 1022, and a commit stage 1024. In one embodiment, mirroring logic (as discussed in conjunction with FIGS. 1-6) may be used by processing core 1090 (illustrated in FIG. 10B) at one or more of the execute stage 1016 and the exception handling stage 1020.

FIG. 10B is a block diagram illustrating an in-order architecture core and a register renaming logic, out-of-order issue/execution logic that may be included in a processor according to at least one embodiment of the disclosure. In FIG. 10B, arrows denote a coupling between two or more units and the direction of the arrow indicates a direction of data flow between those units. FIG. 10B shows processor core 1090 including a front end unit 1030 coupled to an execution engine unit 1050, and both are coupled to a memory unit 1070. In one embodiment, mirroring logic (as discussed in conjunction with FIGS. 1-6) may be included in the execution engine unit 1050. In another embodiment, the mirroring logic may be included in one or more other components of the core 1090 that may be used to mirror address spaces.

The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to a level 2 (L2) cache unit 1076 in the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 162 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1010; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
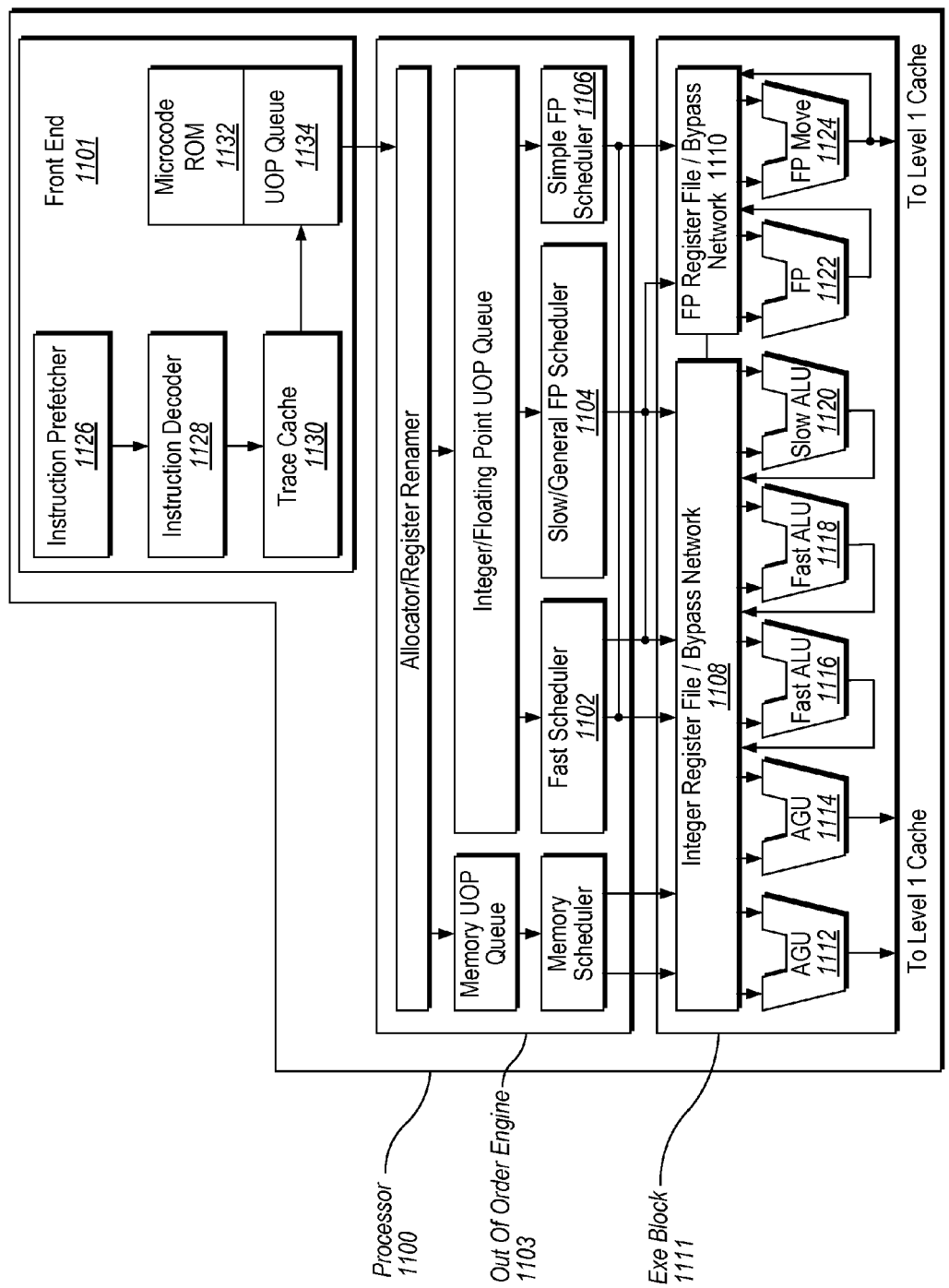
FIG. 11 is a block diagram of the micro-architecture for a processor that includes logic circuits to perform instructions, in accordance with one embodiment of the present invention.

FIG. 11 is a block diagram of the micro-architecture for a processor 1100 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation. In one embodiment, mirroring logic (as discussed in conjunction with FIGS. 1-6) may be included in the execution block 1111. In another embodiment, the mirroring logic may be included in one or more other components of the processor 1100 that may be used to mirror address spaces.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA)

to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, and 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1122, 1124, execute floating point, MMX, SIMD, and SSE, or other operations. The floating point ALU 1122 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
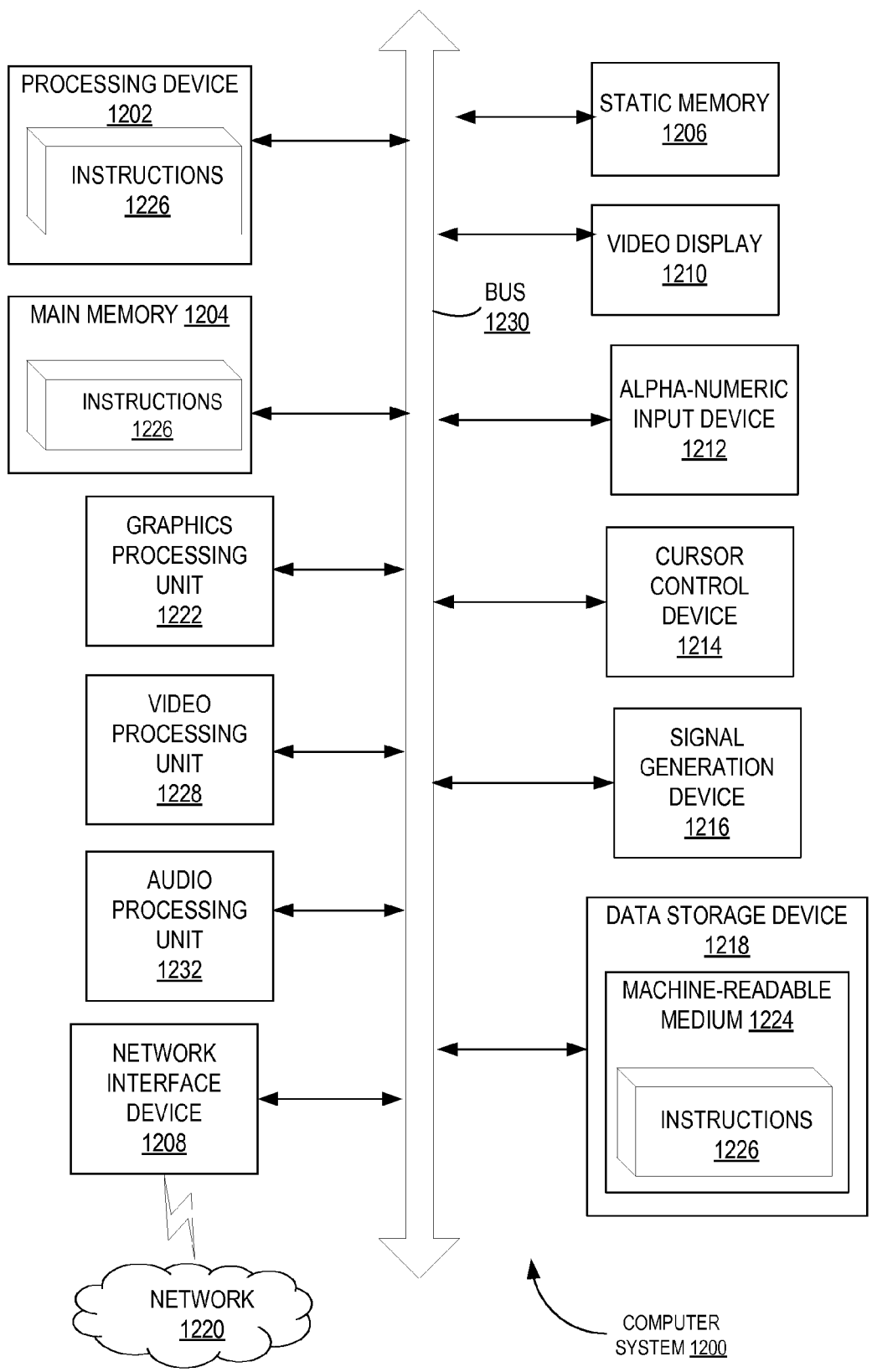
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, mirroring logic (as discussed in conjunction with FIGS. 1-6) may be included in the execution block processing device 1202. In another embodiment, the mirroring logic may be included in one or more other components of the computer system 1200 that may be used to mirror address spaces.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the instructions 1226 of a mirroring logic for performing the operations discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computer system 1200 may include a graphics processing unit 1222, a video processing unit 1228, and an audio processing unit 1232. In another embodiment, the computer system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 embodying any one or more of the methodologies of functions described herein. The instructions 1226 may also reside, completely or at least partially, within the main memory 1204 and/or within the processing device 1202 during execution thereof by the computer system 1200; the main memory 1204 and the processing device 1202 also constituting computer-readable storage media.

The computer-readable storage medium 1224 may also be used to store instructions 1226 utilizing the mirroring logic, such as described with respect to FIGS. 1-6, and/or a software library containing methods that call the above applications. While the computer-readable storage medium 1224 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a method comprising storing a data value at a protected memory address, the protected memory address comprising at least one of a control register or a status register, identifying, by a processing device, a mirror relationship between the protected memory address and an unprotected memory address, and copying, by the processing device, the data value from the protected memory address to the unprotected memory address, wherein the unprotected memory address is directly accessible via an external interface.

Example 2 may optionally extend the subject matter of example 1. In example 2, the method further comprises receiving, via the external interface, a request to access the protected memory address, and providing, in response to the request, access to the unprotected memory address.

Example 3 may optionally extend the subject matter of example 1. In example 3, the method further comprises receiving, via the external interface, an updated data value to be stored in the protected memory address, storing the updated data value in the unprotected memory address, and copying the updated data value from the unprotected memory address to the protected memory address Example 4 may optionally extend the subject matter of examples 1-3. In example 4, the protected memory address comprises a model specific register.

Example 5 may optionally extend the subject matter of examples 1-4. In example 5, the data value at the protected memory address comprises at least one of a power sensor data value or a power effector setting data value.

Example 6 may optionally extend the subject matter of examples 1-5. In example 6, identifying the mirror relationship comprises storing a mapping respectively associating a plurality of protected memory locations with a plurality of unprotected memory locations.

Example 7 may optionally extend the subject matter of examples 1-6. In example 7, the unprotected memory address is directly accessible via the external interface without generating a software interrupt.

Example 8 is a system comprising a memory and a processing device coupled to the memory. The memory comprises a plurality of memory locations referenced by a respective plurality of memory addresses. The processing device is to store a data value at a protected memory address of the plurality of memory addresses, the protected memory address comprising at least one of a control register or a status register, identify a mirror relationship between the protected memory address and an unprotected memory address of the plurality of memory addresses, and copy the data value from the protected memory address to the unprotected memory address, wherein the unprotected memory address is directly accessible via an external interface.

Example 9 may optionally extend the subject matter of example 8. In example 9, the processing device is further to receive, via the external interface, a request to access the protected memory address, and provide, in response to the request, access to the unprotected memory address.

Example 10 may optionally extend the subject matter of example 8. In example 10, the processing device is further to receive, via the external interface, an updated data value to be stored in the protected memory address, store the updated data value in the unprotected memory address, and copy the updated data value from the unprotected memory address to the protected memory address.

Example 11 may optionally extend the subject matter of examples 8-10. In example 11, the protected memory address comprises a model specific register.

Example 12 may optionally extend the subject matter of examples 8-11. In example 12, the data value at the protected memory address comprises at least one of a power sensor data value or a power effector setting data value.

Example 13 may optionally extend the subject matter of examples 8-12. In example 13, the processing device is to identify the mirror relationship by storing a mapping respectively associating a plurality of protected memory locations with a plurality of unprotected memory locations.

Example 14 may optionally extend the subject matter of examples 8-13. In example 14, the unprotected memory address is directly accessible via the external interface without the processing device generating a software interrupt.

Example 15 is a non-transitory computer-readable medium having instructions encoded thereon that, when executed by a processing device, causes the processing device to perform operations comprising storing a data value at a protected memory address, the protected memory address comprising at least one of a control register or a status register, identifying, by a processing device, a mirror relationship between the protected memory address and an unprotected memory address, and copying, by the processing device, the data value from the protected memory address to the unprotected memory address, wherein the unprotected memory address is directly accessible via an external interface.

Example 16 may optionally extend the subject matter of example 15. In example 16, the operations further comprise receiving, via the external interface, a request to access the protected memory address, and providing, in response to the request, access to the unprotected memory address.

Example 17 may optionally extend the subject matter of example 15. In example 17, the operations further comprise receiving, via the external interface, an updated data value to be stored in the protected memory address, storing the updated data value in the unprotected memory address, and copying the updated data value from the unprotected memory address to the protected memory address.

Example 18 may optionally extend the subject matter of example 15-17. In example 18, the data value at the protected memory address comprises at least one of a power sensor data value or a power effector setting data value.

Example 19 may optionally extend the subject matter of examples 15-18. In example 19, identifying the mirror relationship comprises storing a mapping respectively associating a plurality of protected memory locations with a plurality of unprotected memory locations.

Example 20 may optionally extend the subject matter of examples 15-19. In example 20, the unprotected memory address is directly accessible via the external interface without generating a software interrupt.

Example 21 is an apparatus comprising means for storing a data value at a protected memory address, the protected memory address comprising at least one of a control register or a status register, means for identifying a mirror relationship between the protected memory address and an unprotected memory address, and means for copying the data value from the protected memory address to the unprotected memory address, wherein the unprotected memory address is directly accessible via an external interface.

Example 22 may optionally extend the subject matter of example 21. In example 22, the apparatus further comprises means for receiving a request to access the protected memory address, and means for providing, in response to the request, access to the unprotected memory address.

Example 23 may optionally extend the subject matter of example 21. In example 23, the apparatus further comprises means for receiving an updated data value to be stored in the protected memory address, means for storing the updated data value in the unprotected memory address, and means for copying the updated data value from the unprotected memory address to the protected memory address.

Example 24 may optionally extend the subject matter of examples 21-23. In example 24, the protected memory address comprises a model specific register.

Example 25 may optionally extend the subject matter of examples 21-24. In example 25, the data value at the protected memory address comprises at least one of a power sensor data value or a power effector setting data value.

Example 26 may optionally extend the subject matter of examples 21-25. In example 26, the means for identifying the mirror relationship comprises means for storing a mapping respectively associating a plurality of protected memory locations with a plurality of unprotected memory locations.

Example 27 may optionally extend the subject matter of examples 21-26. In example 27, the unprotected memory address is directly accessible via the external interface without generating a software interrupt.

Example 28 is at least one machine readable medium comprising a plurality of instructions that, in response to being executed on a computing device, cause the computing device to carry out a method according to any one of examples 1-7.

Example 29 is an apparatus comprising means for performing the method according to any one of examples 1-7.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC)

devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   storing a data value at a protected memory address, the protected memory address comprising at least one of a control register or a status register;
   identifying, by a processing device, a mirror relationship between the protected memory address and an unprotected memory address; and
   copying, by the processing device, the data value from the protected memory address to the unprotected memory address, wherein the unprotected memory address is directly accessible via an external interface.

2. The method of claim 1, further comprising:
   receiving, via the external interface, a request to access the protected memory address; and
   providing, in response to the request, access to the unprotected memory address.

3. The method of claim 1, further comprising:
   receiving, via the external interface, an updated data value to be stored in the protected memory address;
   storing the updated data value in the unprotected memory address; and
   copying the updated data value from the unprotected memory address to the protected memory address.

4. The method of claim 1, wherein the protected memory address comprises a model-specific register.

5. The method of claim 1, wherein the data value at the protected memory address comprises at least one of a power sensor data value or a power effector setting data value.

6. The method of claim 1, wherein identifying the mirror relationship comprises storing a mapping respectively associating a plurality of protected memory locations with a plurality of unprotected memory locations.

7. The method of claim 1, wherein the unprotected memory address is directly accessible via the external interface without generating a software interrupt.

8. A system comprising:
   a memory comprising a plurality of memory locations referenced by a respective plurality of memory addresses;
   a processing device coupled to memory, the processing device to:
      store a data value at a protected memory address of the plurality of memory addresses, the protected memory address comprising at least one of a control register or a status register;
      identify a mirror relationship between the protected memory address and an unprotected memory address of the plurality of memory addresses; and
      copy the data value from the protected memory address to the unprotected memory address, wherein the unprotected memory address is directly accessible via an external interface.

9. The system of claim 8, wherein the processing device is further to:
   receive, via the external interface, a request to access the protected memory address; and
   provide, in response to the request, access to the unprotected memory address.

10. The system of claim 8, wherein the processing device is further to:
    receive, via the external interface, an updated data value to be stored in the protected memory address;
    store the updated data value in the unprotected memory address; and
    copy the updated data value from the unprotected memory address to the protected memory address.

11. The system of claim 8, wherein the protected memory address comprises a model specific register.

12. The system of claim 8, wherein the data value at the protected memory address comprises at least one of a power sensor data value or a power effector setting data value.

13. The system of claim 8, wherein the processing device is to identify the mirror relationship by storing a mapping respectively associating a plurality of protected memory locations with a plurality of unprotected memory locations.

14. The system of claim 8, wherein the unprotected memory address is directly accessible via the external interface without the processing device generating a software interrupt.

15. A non-transitory computer-readable medium having instructions encoded thereon that, when executed by a processing device, cause the processing device to perform operations comprising:
    storing a data value at a protected memory address, the protected memory address comprising at least one of a control register or a status register;
    identifying, by a processing device, a mirror relationship between the protected memory address and an unprotected memory address; and
    copying, by the processing device, the data value from the protected memory address to the unprotected memory address, wherein the unprotected memory address is directly accessible via an external interface.

16. The non-transitory computer-readable medium of claim 15, the operations further comprising:
    receiving, via the external interface, a request to access the protected memory address; and
    providing, in response to the request, access to the unprotected memory address.

17. The non-transitory computer-readable medium of claim 15, the operations further comprising:
    receiving, via the external interface, an updated data value to be stored in the protected memory address;
    storing the updated data value in the unprotected memory address; and
    copying the updated data value from the unprotected memory address to the protected memory address.

18. The non-transitory computer-readable medium of claim 15, wherein the data value at the protected memory address comprises at least one of a power sensor data value or a power effector setting data value.

19. The non-transitory computer-readable medium of claim 15, wherein identifying the mirror relationship comprises storing a mapping respectively associating a plurality of protected memory locations with a plurality of unprotected memory locations.

20. The non-transitory computer-readable medium of claim 15, wherein the unprotected memory address is directly accessible via the external interface without generating a software interrupt.

* * * * *